(12) United States Patent
Shimizu

(10) Patent No.: US 7,126,753 B2
(45) Date of Patent: Oct. 24, 2006

(54) TWO-STAGE VARIABLE POWER BINOCULARS

(75) Inventor: Fumio Shimizu, Minamiminowa-mura (JP)

(73) Assignee: Kabushiki Kaisha Light Kohki Seisakusho, Suwa (JP)

( * ) Notice: Subject to any disclaimer, the term of this patent is extended or adjusted under 35 U.S.C. 154(b) by 0 days.

(21) Appl. No.: 11/197,654

(22) Filed: Aug. 4, 2005

(65) Prior Publication Data

US 2006/0023302 A1 Feb. 2, 2006

(51) Int. Cl.
*G02B 23/00* (2006.01)
*G02B 23/14* (2006.01)
*G02B 15/14* (2006.01)

(52) U.S. Cl. ............... 359/416; 359/407; 359/432
(58) Field of Classification Search ........ 359/404–432, 359/480–482, 676, 694–706
See application file for complete search history.

(56) References Cited

U.S. PATENT DOCUMENTS

| | | | | |
|---|---|---|---|---|
| 4,030,808 A | * | 6/1977 | Hornschu et al. ........... 359/416 |
| 4,436,387 A | * | 3/1984 | Shimizu ..................... 359/418 |
| 5,064,279 A | * | 11/1991 | Riedl .......................... 359/416 |
| 5,971,540 A | * | 10/1999 | Ofner ......................... 351/158 |
| 6,412,958 B1 | * | 7/2002 | Aikawa ....................... 359/600 |

FOREIGN PATENT DOCUMENTS

JP 63-65013 4/1988

* cited by examiner

*Primary Examiner*—Thong Q Nguyen
(74) *Attorney, Agent, or Firm*—Jordan and Hamburg LLP

(57) ABSTRACT

The two-stage variable power binoculars are configured so that, in right and left body tubes focus lenses are movably provided in the direction of optical axis, movable frames are movably provided in a direction so as to intersect with the optical axis, magnification switch lenses are respectively provided in the movable frames a magnification switch knob for moving the focus lenses and movable frames is provided in a center portion connecting the body tubes and the magnification switch knob is operated to move the movable frames so that the magnification switch lenses are disposed at either the high-magnification position on the optical axis or at the low-magnification position set back from the optical axis, and simultaneously, to move the focus lenses so that focus is adjusted.

1 Claim, 1 Drawing Sheet

TWO-STAGE VARIABLE POWER BINOCULARS

BACKGROUND OF THE INVENTION

The present invention relates to binoculars capable of two-stage magnification change; more specifically, it relates to two-stage variable power binoculars configured so that the size of the apparent field of vision does not change when the magnification is changed.

With conventional variable power binoculars a zoom knob and zoom lever are rotated to change magnification continuously. However, such binoculars tend to lack instantaneousness when magnification is changed.

Two-stage variable power binoculars are known as variable power binoculars that instantaneously change magnification. Two-stage variable power binoculars are configured such that magnification is changed by sliding operation of a focal adjustment knob, and focal adjustment is made by rotational operation of the same (see, for example, patent reference 1).

Patent reference 1: Laid-open Japanese Utility Model S63-65013

The two-stage variable power binoculars of patent reference 1 are configured such that a focal adjustment knob is provided that can slide or rotate in the optical axis direction, and at the time of a prescribed magnification (for example, magnification of 10), the focal adjustment knob is slid in a set direction to move a magnification switch lens off the optical axis, and in this state, the focal adjustment knob is rotated to adjust focus.

When magnification is to be changed (for example, to a magnification of 20), the focal adjustment knob is slid in the reverse direction to return the magnification switch lens to the optical axis, and in this state, the focal adjustment knob is rotated to adjust focus.

Such two-stage variable power binoculars are configured so that when the focal adjustment knob is operated to focus on an object, the magnification switch lens is prevented from moving from a position once it has been set.

Therefore, when magnification is to be returned to the original setting, the focal adjustment knob is again slid in the reverse direction to change magnification, and the focal adjustment is carried out using the same operation as described above.

BRIEF SUMMARY OF THE INVENTION

However, when magnification is to be switched, such two-stage power variable binoculars require a first operation for sliding the focal adjustment knob to first move the magnification switch lens, and a second operation for rotating the focal adjustment knob to adjust focus.

Therefore, switching magnification of such two-stage variable power binoculars is relatively troublesome, and from this perspective there is room for improvement.

The object of the present invention is to provide two-stage variable power binoculars such that magnification can be switched by a simple operation.

To achieve the aforesaid object, the two-stage variable power binoculars of the present invention are configured such that, in each of right and left body tubes, a focus lens is movably provided in the optical axis direction, a movable frame is movably provided in a direction so as to intersect with the optical axis, a magnification switch lens is provided on the movable frame, a magnification switch knob for moving the focus lenses and the movable frames is provided in a center portion connecting the right and left body tubes, and the magnification switch knob is operated to move the movable frames so that the magnification switch lens can be disposed at either a high-magnification position on the optical axis or a low-magnification position set back from the optical axis, and simultaneously, to move the focus lenses so that focus is adjusted With the two-stage variable power binoculars of the present invention, operation of a magnification switch knob causes right and left magnification switch lenses to be disposed either at a high magnification position or at a low magnification position and moves the focus lenses to set focus.

Thus, focus blur occurring at time of magnification switch can be adjusted simultaneously with switching magnification. As a result, magnification can be switched while maintaining a state of focus on an object.

Also, because of a simple configuration such that a movable frame is provided in each of the right and left body tubes and a magnification switch lens is provided in each of the right and left movable frames, two-stage magnification can be achieved in binoculars with a size virtually the same as that of binoculars with a single magnification.

With the two-stage variable power binoculars of the present invention, magnification is switched while maintaining a state of focus on an object, thereby attaining the effect of switching magnification with a simple operation.

BRIEF DESCRIPTION OF THE DRAWINGS

Accompanying the specification is a FIGURE which assist in illustrating the invention, in which.

DETAILED DESCRIPTION OF THE INVENTION

Figure 1:
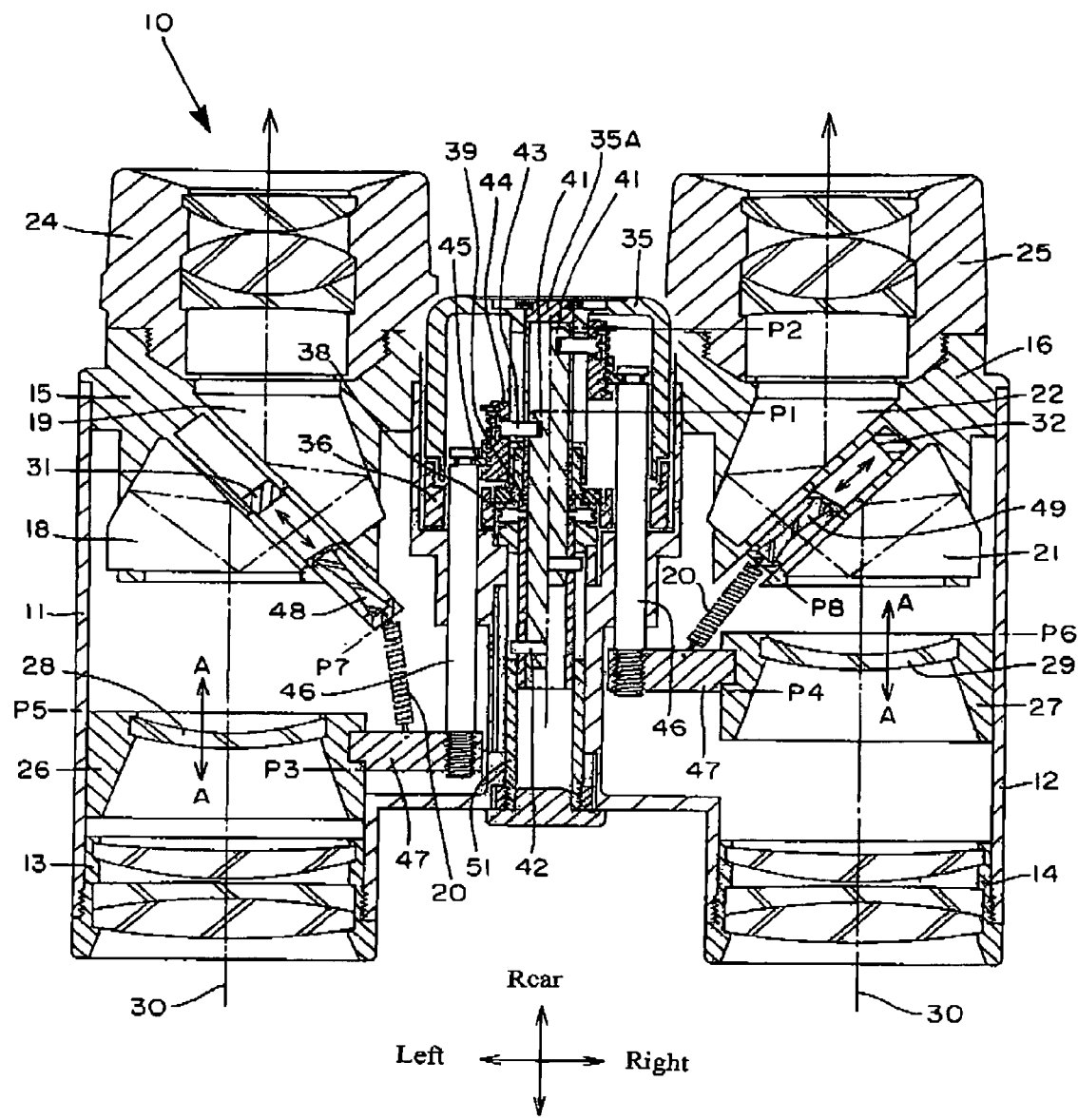
FIG. 1 is a cross-sectional view that shows two-stage variable power binoculars relating to the present invention, and that shows a low magnification state on the left half of the drawing and a high magnification state on the right half.

An embodiment relating to the present invention will be explained in detail with reference to a drawing. FIG. 1 illustrates a cross-sectional view showing two-stage variable power binoculars relating to the present invention.

In order to facilitate understanding of the configuration of the two-stage variable power binoculars, a state of low magnification (for example, a magnification of 10) is shown in the left half of FIG. 1, and a state of high magnification (for example, a magnification of 20) is shown in the right half.

The two-stage variable power binoculars 10 illustrated in FIG. 1 are configured such that left and right objective lens units 13, 14 are respectively provided at the front ends of left and right body tubes (hereinafter, "bodies") 11, 12, left and right prism frames 15, 16 are respectively provided at the rear end of the left and right bodies 11, 12, a pair of prisms 18, 19 are incorporated in the right prism frame 15, a pair of prisms 21, 22 are incorporated in the left prism frame 16, left and right eyepiece lens units 24, 25 are respectively provided at the rear end of the left and right prism frames 15, 16, left and right movable tubes 26, 27 are respectively movably provided in the right and left bodies 11, 12 in the direction of optical axis 30 (direction of arrow A—A), right and left focus lenses 28, 29 are respectively provided in the right and left movable tubes 26, 27, a left movable frame 31 is provided in the space between the prisms 18, 19 of the left prism frame 15, and a right movable frame 32 is provided in the space between the prisms 21, 22 of the right prism frame 16.

Further, the two-stage variable power binoculars 10 further comprise, between the right and left bodies 11, 12, a diopter knob 35 for adjusting focus, and to the front side of the diopter knob 35, a magnification switch knob 36 for switching magnification.

When the magnification switch knob 36 is rotated, a cam tube 39 mated with the magnification switch knob 36 rotates via a connecting screw 38 engaged with a vertical groove of the magnification switch knob 36.

A connecting pin 42 engaged with a movable rod 41 is engaged with a cam groove of the cam tube 39. Thus, when the cam tube 39 is rotated, the movable rod 41 is moved in the direction of optical axis 30 via the connecting pin 42.

A groove is provided on the rear end of the movable rod 41, a screw 43 is attached to the groove, and the screw 43 is attached to a helicoid ring 44.

A movable ring 45 engages with the helicoid ring 44 by engaging with a helicoid screw. A movable long rod 46 engages with the movable ring 45.

A connecting frame 47 attaches by screw mating to the front end of the movable long rod 46. The connecting frames 47 are respectively engaged with the movable tubes 26, 27.

The movable frames 31, 32 are respectively connected to the connecting frames 47 via respective tension members (connecting members) 20. Thus the positions of the movable frames 31, 32 are determined by the position of the connecting frames 47.

In inward half portions of the movable frames 31, 32, right and left magnification switch lenses 48, 49 are respectively provided.

On a central axis 51, there are provided vertical and transverse linear grooves so as to respectively engage with the connecting pin 42 and the connecting screw 38. These vertical and transverse linear grooves are configured to allow the various members to operate as described above.

Operation of the two-stage variable power binoculars 10 will be explained with reference to FIG. 1, based on an example in which a low magnification state (state of the left half of the drawing) is switched to a high magnification state (state of the right half).

When the magnification switch knob 36 is rotated, the connecting screw 38 engaged with the groove of the magnification switch knob 36 rotates. When the connecting screw 38 rotates, the cam tube 39 rotates together with the connecting screw 38.

When the cam tube 39 rotates, the connecting pin 42 engaged with the cam groove of the cam tube 39 rotates together with the cam tube 39.

The connecting pin 42 is provided so as to engage with the vertical groove of the central axis 51 and to penetrate the movable rod 41. When the connecting pin 42 is rotated together with the cam tube 39, due to the movement of the connecting pin 42, the movable rod 41 is moved from a position P1 to a position P2.

The connecting frames 47 are moved from a position P3 to a position P4, and the right and left focus lenses 28, 29 are moved together with the connecting frames 47 from a position P5 to a position P6.

Simultaneously, the connecting frame 47 is moved from the position P3 to the position P4, so that the tension member 20 is no longer stretched, and the tension member 20 moves the movable frames 31, 32 from a position P7 to a position P8.

The length of the tension member 20 is set so that as the connecting frame 47 moves, the movable frames 31, 32 are pushed so as to move to the position P8 and are pressed and fixed at the position P8 by the tension member 20.

As a result, the right and left magnification switch lenses 48, 49 are disposed on the optical axes 30, thereby causing the two-stage variable power binoculars 10 to switch from a low magnification state (state of the left half of FIG. 1) to a high magnification state (state of the right half).

On the other hand, when the two-stage variable power binoculars 10 are to be switched from a high magnification state (state of the right half) to a low magnification state (state of the left half), the magnification switch knob 36 is rotated in a direction opposite to the direction described above.

As a result, the magnification switch lenses 48, 49 are disposed at positions removed from the optical axes 30, causing the two-stage variable power binoculars 10 to switch from a high magnification state (state of the right half) to a low magnification state (state of the left half).

As described above, with the two-stage variable power binoculars 10 of the present invention, by operation of the magnification switch knob 36, the right and left magnification switch lenses 48, 49 are disposed either at the high magnification position or at the low magnification position and the focal lenses 28, 29 are moved so that focus is adjusted.

As a result, out-of-focus conditions occurring when the magnification is switched can be adjusted simultaneously with the magnification switch, and magnification of the binoculars can be switched while a state of focus on an object is maintained.

Further, because of a simple configuration such that movable frames are respectively provided in the right and left bodies 11, 12, and the magnification switch lenses 48, 49 are respectively provided in the right and left movable frames 31, 32, two-stage magnification can be achieved in binoculars of virtually the same size as that of binoculars with a single magnification.

At time of use of the two-stage variable power binoculars 10, the diopter knob 35 is rotated when focal adjustment is to be made within the range between a nearby position and the position. When the diopter knob 35 is rotated, a knob central shaft 35A also rotates.

A vertical groove is provided on the knob central shaft 35A, and the screw 43 is provided within the vertical groove. Therefore, the screw 43 rotates together with the knob central shaft 35A.

Because this screw 43 is screw-fixed on the helicoid ring 44, the helicoid ring 44 rotates together with the screw 43.

Because rotation of the movable ring 45 is restricted by the movable long rod 46, the action of the helicoid screw moves it in a front-rear direction.

As a result, the focus lenses are moved in the front-rear direction (i.e., direction of the optical axis 30) via the movable long rod 46 and the connecting frame 47. The movement of the focus lenses in the front-rear direction (i.e. direction of the optical axis 30) adjusts the focus.

At this time, the tension member 20 works so that the movable frames 31, 32 maintain a static state at the desired position.

Therefore, when focus is adjusted using the diopter knob 35, there is no danger of switching magnification.

As means for causing the movable frames 31, 32 to stop at prescribed positions when adjusting focus, an electromagnet or motor can be used.

The length of the tension member 20 is set so that, when the tension member 20 is at P7, it is fixed by a pulling force, and when the same is at P8, it is fixed by a pressing force, and only within a range in which the pulling and pressing forces are maintained do the movable tubes 26, 27 for adjusting focus move and does focus adjustment occur.

With the two-stage variable power binoculars 10, the light flux range becomes smaller, a large effective diameter is ensured, and a large actual field of vision is possible.

The present invention may be embodied in other specific forms without departing from its spirit or essential characteristics. The described embodiments are to be considered in all respects only as illustrative and not as restrictive. The scope of the invention is, therefore, indicated by the appended claims and their combination in whole or in part rather than by the foregoing description. All changes that come within the meaning and range of equivalency of the claims are to be embraced within their scope.

I claim:

1. A two-stage variable power binocular comprising:

right and left body tubes and right and left focus lenses, the lenses each being movably disposed in an optical axis direction;

movable frames being movably disposed in a direction so as to intersect with the optical axis direction;

magnification switch lenses being disposed on said movable frames;

a magnification switch knob for moving the focus lenses and the movable frames, said magnification switch knob being disposed in a center portion connecting said right and left body tubes;

said magnification switch knob moving said movable frames for:

positioning said magnification switch lenses either at a high magnification position on the optical axis or a low magnification position set back from the optical axis; and simultaneously positioning said focus lenses for adjusting focus.

* * * * *